United States Patent Office 3,580,893
Patented May 25, 1971

3,580,893
PROCESS FOR THE PREPARATION OF CYCLIC ACID ANHYDRIDES
William J. Heilman, Allison Park, Pa., assignor to Gulf Research & Development Company, Pittsburgh, Pa.
No Drawing. Continuation-in-part of application Ser. No. 594,347, Oct. 25, 1966. This application May 26, 1969, Ser. No. 828,001
Int. Cl. C08f 27/12
U.S. Cl. 260—78.5T                                                    1 Claim

ABSTRACT OF THE DISCLOSURE

A process is defined for heating an organic compound containing at least one half-ester of a dicarboxylic acid where the carbonyl groups are directly connected to adjacent internal aliphatic carbon atoms to a temperature in excess of about 80° C. to convert the half-ester groups to cyclic anhydride groups and a by-product alcohol. The organic compound is a 1:1 copolymer of an aliphatic hydrocarbon having at least three carbon atoms, such as 1-hexene, and maleic anhydride. The organic compound prepared from an olefin having from three to ten carbon atoms can be precipitated as a solid from its homogeneous reaction medium by pouring the reaction solution into a monohydroxy alcohol having one to four carbon atoms, such as methanol. Some methyl half-ester forms can be removed by heating the separated solid product at a temperature in excess of 80° C. while removing the monohydroxy alcohol. Thus, 1-hexene-maleic anhydride copolymers free of half-ester groups can be recovered. If the organic compound contains both half-ester and diester groups, the resulting compound after heating to a temperature in excess of 80° C. will contain anhydride and diester linkages.

This invention relates to a method for the preparation of cyclic acid anhydrides and more particularly to the preparation of high purity cyclic acid anhydrides from certain organic compounds containing the half-ester of a dicarboxylic acid.

This application is a continuation-in-part of my copending Ser. No. 594,347, filed Oct. 25, 1966, now abandoned and assigned to the same assignee as the present application.

The reaction of maleic anhydride with an alpha olefin to produce a copolymer is a known reaction. It has been found, however, that in most instances the reaction does not go to completion, and the copolymer product remains contaminated with small amounts of unreacted maleic anhydride and/or unreacted alpha olefin. These small amounts of unreacted materials need to be removed since they may interfere in subsequent reactions involving the copolymers. Normally, the copolymer is freed of these impurities by mixing the copolymer in an alcohol, such as methanol, which dissolves the unreacted components. In other instances, the copolymer is soluble in the polymerization reaction medium and the copolymer solution is mixed with an aliphatic alcohol which not only serves to dissolve any unreacted monomers, but acts as a precipitating medium so that a solid copolymer product can be obtained free of unwanted monomers. An alcohol, however, will react with the anhydride groups of the copolymer to produce a half-ester in the following manner:

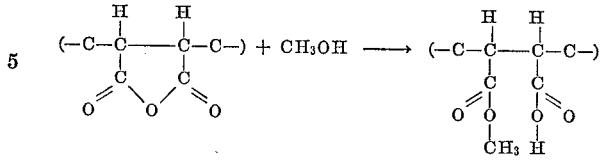

The reaction of the alcohol with the copolymer is a slow reaction, especially at room temperature, but the time required for the washing-precipitation procedure is such that some half-ester is inevitably formed. Thus, while the washing-precipitation procedure solves the problem of eliminating any unreacted monomers, it presents a second purification problem involving the conversion of the half-ester back to the anhydride.

It has now been found, quite unexpectedly, that certain half-ester compounds can be converted to cyclic acid anhydrides and a by-product alcohol by a simple heating at relatively low temperatures, while removing the by-product alcohol as quickly as it is formed.

In accordance with the invention, a substantially pure cyclic acid anhydride is produced by a process which comprises heating an organic compound having at least one divalent radical having the formula:

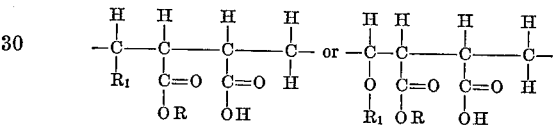

where R is a hydrocarbon radical having from one to ten, preferably from one to four, carbon atoms and $R_1$ is a hydrocarbon radical having from one to 48, preferably from four to 18, carbon atoms at a temperature in excess of about 80° C. to convert the half-ester portion of said divalent radical to a cyclic anhydride group and a by-product alcohol corresponing to the formula:

ROH where R is as defined:
removing the by-product alcohol from contact with the organic compound product substantially as quickly as it is formed; and
recovering an organic compound product substantially free of said half-ester groups.

The process of this invention is applicable to the conversion of any organic compound containing at least one divalent radical having the formula:

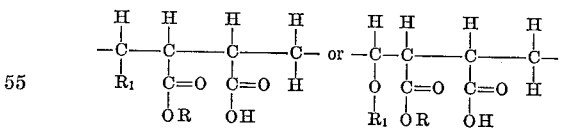

where R is a hydrocarbon radical having from one to ten, preferably from one to four, carbon atoms and $R_1$ is a hydrocarbon radical having from one to 48, preferably from 4 to 18, carbon atoms. By the term "hydrocarbon radical" in this specification is meant any group of atoms consisting of carbon and hydrogen, such as alkyl, cycloalkyl, aryl, alkaryl and aralkyl. Unless otherwise indicated, the term "alkyl" is meant to include only saturated groups.

The term "hydrocarbon radical" is therefore intended to substantially exclude olefinic unsaturation in the radicals unless otherwise indicated. The organic compound must therefore have at least eight carbon atoms, and at least four carbon atoms in a straight chain and the carbonyl groups of the acid and ester functions of the half-ester groups must be directly attached to adjacent internal aliphatic carbon atoms. By "internal carbon atoms" is meant carbon atoms which do not terminate the carbon chain in the organic compound. The process of the invention is not applicable to the treatment of organic compounds containing half-esters where the carbonyl groups of the acid and ester functions are directly atached to terminal carbon atoms, such as methyl hydrogen succinate or to the treatment of organic compounds containing half-esters of dicarboxylic acids where the carbonyl groups of the acid and ester functions are directly attached to an aromatic ring, such as methyl phthalate, or to the random half-esters of ethylene-maleic anhydride copolymers.

The preferred charge stocks are those prepared by the copolymerization of maleic anhydride and an alpha olefin having from 3 to 50, preferably 6 to 20, carbon atoms per molecule and then at least partially randomly half-esterified with an alcohol having from one to ten, preferably one to four, carbon atoms. Thus, it is preferred in the process of this invention to heat a copolymer of maleic anhydride and an alpha olefin having from 3 to 50, preferably 6 to 20, carbon atoms wherein said copolymer is at least partially randomly half-esterified with an alcohol having from one to ten, preferably one to four, carbon atoms.

The maleic anhydride-alpha olefin copolymers have the formula:

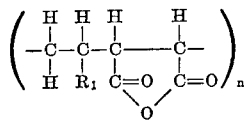

where $R_1$ is as defined and $n$ is an integer from 2 to 100. These copolymers can then be reacted with an aliphatic monohydroxy alcohol having the formula ROH where R is an alkyl group having from one to ten carbon atoms to produce a copolymer having at least one half-ester group. The half-ester groups will usually be randomly distributed along the copolymer chain. All of the cyclic anhydride groups can be half-esterified or block sections of the copolymers can be half-esterified.

The more preferred charge stocks are those having the formula:

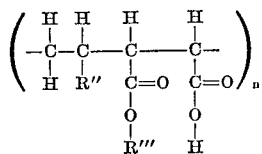

where R''' is a hydrocarbon radical having from one to four carbon atoms and R'' is a hydrocarbon radical having from 2 to 20 carbon atoms, and $n$ is an integer from 2 to 100, usually from 10 to 50.

The charge stocks of this invention can be prepared in any suitable manner, and their method of preparation or source is not critical. Thus, suitable half-esters can be purchased and converted to the desired cyclic anhydride in high purity while obtaining as a by-product an alcohol, the alkyl portion of which corresponds to the alkyl portion of the half-ester.

The process of the present invention is particularly applicable, however, to the purification of copolymers of olefinically unsaturated compounds, such as alpha olefins having at least three carbon atoms with maleic anhydride, which copolymers contain a plurality of internal cyclic anhydride groups and, as an impurity, small amounts of randomly distributed half-ester groupings, i.e.

where on the order of 0.5 to 20 mole percent of the anhydride groups are half-esterified. These copolymers are generally prepared by methods well known in the art. It is most convenient to perform the polymerization reaction in the presence of a liquid organic diluent which is at least a solvent for the monomers involved in the reaction.

One of the monomers is maleic anhydride, i.e.

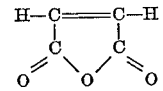

It is preferred that the maleic anhydride be substantially free of maleic acid. The maleic anhydride will, of course, react with water to form the undesired maleic acid. Commerical maleic anhydride is suitable for use in the process of this invention, but in the event it is exposed to water and thereby becomes contaminated with maleic acid, means should be employed to remove the maleic acid before the maleic anhydride is used in the subject process One suitable method of purifying the maleic anhydride is to dissolve the maleic anhydride in a liquid, such as benzene, which is a solvent for the maleic anhydride but a non-solvent for the maleic acid. The acid can then be separated by filtration or otherwise and the maleic anhydride recovered by evaporation of the benzene.

The maleic anhydride monomer can be copolymerized with an olefinic compound as represented by the general formula:

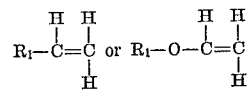

where $R_1$ is as defined above, i.e. a hydrocarbon radical having from one to 48, preferably from 4 to 18, carbon atoms. The olefiinic compound suitably has from 3 to 50 carbon atoms per molecule, preferably from 3 to 20, and more preferably from 6 to 10 carbon atoms per molecule.

The preferred olefinic compound for use in forming the solid polyanhydride component of the compositions of this invention are the aliphatic alpha monoolefins and, in particular, the straight-chain alpha monoolefins having from 3 to 20 carbon atoms per molecule.

It is understood that the term "olefin" is meant to include mixtures of monoolefins having from 3 to 50 carbon atoms per molecule, such as those obtained by the thermal or catalytic cracking of petroleum stocks. It is desirable that only one olefinic bond per molecule be present in the olefin. Minor amounts of diolefins, on the order of two percent or less, can however, be tolerated in the olefin.

Examples of olefin compounds or mixtures of olefins suitable as co-monomers include:

methylvinylether;
ethylvinylether;
propylvinylether;
butylvinylether;
propylene;
1-butene;
2-butene;
1-pentene;
2-pentene;
2-methyl-1-butene;
1-hexene;
styrene;
3-hexene;
4-methyl-1-pentene;
1-heptene;
3-ethyl-2-pentene;
3,3-dimethyl-1-pentene;
1-octene;
2-methyl-1-heptene;
3,3-dimethyl-1-hexane;

1-nonene;
4-nonene;
4,4-dimethyl-1-heptene;
1-decene;
2-decene;
1-undecene;
2-methyl-4-propyl-3-heptene;
1-dodecene;
1-tridecene;
1-tetradecene;
tetraisobutylene;
1-octadecene;
1-eicosene;
2-methyl-1-nonadecene;
1-docosene;
1-heptacosene;
1-hentriacontene;
3-heptadecyl-2-eicosene;
2-methylpentene-1; and
2-methylbutene-1.

The copolymerization can be conducted in any suitable manner. One suitable copolymerization procedure involves contacting the olefinic compound with the maleic anhydride in a suitable solvent in the presence of a free-radical producing catalyst, such as a peroxide. The ratio of the olefinic compound to the maleic anhydride can vary over a wide range, but is generally between about 1:1 and 5:1, with preferred ranges between 1:1 and 3:1. The particularly preferred molar ratio of olefin to anhydride compound will depend to a large extent on the specific olefins employed. For example, for the copolymerization of aliphatic mono-alpha-olefins and maleic anhydride, the ratio of olefin to anhydride is desirably between about 1:1 and 3:1.

The polymerization reaction is a solution-type polymerization wherein the maleic anhydride and olefin monomers are dissolved in a common solvent. The copolymerization can be initiated by any free-radical producing material well known in the art. The preferred free-radical initiators are the peroxide-type polymerization initiators and the azo-type polymerization initiators. Benzoyl peroxide is the most preferred initiator. Radiation can also be used to initiate the reaction, if desired.

The peroxide-type free-radical initiator can be organic or inorganic, the organic peroxides having the general formula:

$$R_7OOR_8$$

where $R_7$ is any organic radical and $R_8$ is selected from the group consisting of hydrogen and any organic radical. Both $R_7$ and $R_8$ can be organic radicals, preferably hydrocarbon, aroyl, and acyl radicals, carrying, if desired, substituents such as halogens, etc. The most preferred peroxides are the diaroyl and diacyl peroxides.

Examples of suitable peroxides, which in no way are limiting, include benzoyl peroxide, lauroyl peroxide; tertiary butyl peroxide; 2,4-dichlorobenzyl peroxide; tertiary butyl hydroperoxide; cumene hydroperoxide; diacetyl peroxide; acetyl hydroperoxide; diethylperoxycarbonate; tertiary butyl perbenzoate; and the various compounds, such as the perborates.

The azo-type compounds, typified by alpha,alpha'-azo-bis-isobutyronitrile, are also well-known free-radical promoting materials. These azo compounds can be defined as those having present in the molecule group —N=N—; wherein the valences are satisfied by organic radicals, at lease one of which is preferably attached to a tertiary carbon. Other suitable azo compounds include, but are not limited to, p-bromobenzenediazonium fluoborate; p-tolyl-diazoaminobenzene; p - bromobenzenediazonium hydroxide; azomethane and the phenyldiazonium halides. A suitable list of azo-type compounds can be found in United States Pat. No. 2,551,813, issude May 8, 1951 to Paul Pinkney.

The amount of initiator to employ, exclusive of radiation, of course, depends to a large extent on the particular initiator chosen, the olefinic charge stock and the reaction conditions. The initiator must, of course, be soluble in the reaction medium. The usual concentrations of initiator are between 0.001:1 and 0.1:1 moles of initiator per mole of maleic anhydride, with preferred amounts between 0.005:1 and 0.03:1. In general, the more reactive olefins, such as the vinylidene-type, require smaller amounts of the initiator.

The polymerization temperature must be sufficiently high to break down the initiator to produce the desired free-radicals. For example, using benzoyl peroxide as the initiator, the reaction temperature can be between 75° C. and 90° C., preferably between 80° and 85° C. Higher and lower temperatures can be employed, a suitable broad range of temperatures being between 20° C. and 200° C., with preferred temperatures between 50° C. and 120° C.

The reaction pressure should be sufficient to maintain the solvent in the liquid phase. Increased pressure, however, in addition to being an added expense, also promotes unwanted side reactions, such as polymerization of the olefinic compound. Pressures can therefore vary between about atmospheric and 100 p.s.i.g. or higher, but the preferred pressure is atmospheric.

The reaction time is usually sufficient to result in the substantially complete conversion of the maleic anhydride monomer to copolymer. The reaction time is suitably between one and 24 hours, with preferred reaction times between two and ten hours.

As noted above, the subject reaction is a solution type polymerization reaction. The olefin, maleic anhydride, solvent and initiator can be brought together in any suitable manner. The important factors are intimate contact of the olefin and maleic anhydride in the presence of a free-radical producing material. The reaction, for example, can be conducted in a batch system where the olefin is added all initially to a mixture of maleic anhydride, initiator and solvent or the olefin can be added intermittently or continuously to the reaction pot. In another manner, the components in the reaction mixture can be added continuously to a stirred reactor with continuous removal of a portion of the product to a recovery train or to other reactors in series. The reaction can also suitably take place in a coil-type reactor where the components are added at one or more points along the coil.

The reaction solvent, as noted above, must be one which dissolves both the maleic anhydride and the olefinic monomer. It is necessary to dissolve the maleic anhydride and olefinic monomer, so as to bring them into intimate contact in the solution polymerization reaction. It has been found that the solvent must also be one in which the resultant copolymers are soluble, but not so soluble that the copolymers cannot be precipitated out of solution by the addition of a non-solvent for the copolymers.

Suitable solvents include liquid saturated or aromatic hydrocarbons having from 6 to 20 carbon atoms; ketones having from three to five carbon atoms; and liquid saturated aliphatic dihalogenated hydrocarbons having from one to five carbon atoms per molecule, preferably from one to three carbon atoms per molecule. By "liquid" is meant liquid under the conditions of polymerization. In the dihalogenated hydrocarbons, the halogens are preferably on adjacent carbon atoms. By "halogen" is meant F, Cl and Br. The amount of solvent must be such that it can dissolve the maleic anhydride and olefin monomers in addition to the resulting copolymers. The volume ratio of solvent to olefinic monomer is suitably between 1:1 and 100:1 and is preferably between 1.5:1 and 4:1.

The preferred solvents are the saturated hydrocarbons having from six to ten carbon atoms and the saturated dichlorinated hydrocarbons having from one to five, more preferably one to three, carbon atoms.

Examples of suitable solvents include, but are not limited to:

(1) saturated hydrocarbons such as:
hexane; pentane; heptane; octane; and isooctane
(2) aromatic hydrocarbons such as.
benzene; xylene; and toluene and (3) saturated dihalogenated hydrocarbons such as:
dichloromethane; dibromomethane; 1 - bromo - 2- chloro-ethane; 1,1-dibromoethane; 1,1 - dichloro-ethane; 1,2-dichloroethane; 1,3 - dibromopropane; 1,2-dibromopropane; 1,2-dibromo - 2 - methylpropane; 1,2-dichloropropane; 1,1 - dichloropropane; 1,3-dichloropropane; 1-bromo - 2 - chloropropane; 1,2-dichlorobutane; 1,5-dibromopentane; and 1,5-dichloropentane.

The molecular weight of the polyanhydride component of the compositions of this invention can vary over a wide range. The inherent viscosity (which is a measure of molecular weight) of five grams of the polyanhydride per deciliter of acetone at 77° F. can suitably be between about 0.05 and 1.5 deciliters per gram and is usually from 0.06 to 0.08 deciliter per gram.

Such undesired half-ester group impurities in the copolymers prepared as above may occur due to the nature of the recovery of the desired polyanhydride by precipitation and recovery from an alcohol. Thus, normally the copolymers which are prepared, as noted above, are contacted in some way with an alcohol. Thus, alcohols, especially methanol, ethanol, propanol and butanol, are frequently employed to dissolve unreacted monomers from the product and/or to aid in precipitating the copolymer in a solid form if it is soluble in the reaction medium. The preciiptated copolymer may then be removed by filtration, centrifugation, etc. and washed with more alcohol. As a result of the precipitation, filtration and washing procedures, some of the anhydride groups in the polyanhydrides are converted to the half-ester form even though low temperatures and other precautions are taken to avoid half-ester formation.

In fact, in accordance with one aspect of this invention, copolymers of maleic anhydride and an aliphatic alpha olefin having from three to ten carbon atoms are prepared in a finely divided filterable form by a process which comprises: copolymerizing maleic anhydride and at least one of said olefins in the presence of a free-radical catalyst and a solvent for the maleic anhydride, said aliphatic alpha olefin and the resulting copolymer; and thereafter admixing said copolymer product while in solution with a monohydroxy aliphatic alcohol having from 1 to 4 carbon atoms, the amount of said alcohol being sufficient and the rate of addition of said copolymer solution being such as to result in precipitation of the copolymer in a particulate solid form.

For this aspect of the invention, the olefin can be a single olefin or a mixture of two or more olefins having from three to ten, and preferably from four to eight, carbon atoms per molecule. Examples of suitable olefins include propylene; 1-butene; 1-hexene; 1-octene and 1-decene.

After copolymerization of the maleic anhydride and the alpha olefin by solution polymerization defined above, the reaction mixture comprising the copolymer, any unreacted monomers and the solvent is then added to a liquid monohydroxy alcohol having from one to four, preferably from one to three, carbon atoms at a rate such that the copolymer precipitates in a particulate filterable solid form.

Suitable alcohols which function as a non- or anti-solvent for the copolymer include methanol; ethanol; n-propanol; isopropanol; and n-butanol. The preferred alcohols are methanol, ethanol and the propanols.

It is preferably to remove any excess solvent before adding the reaction mixture to the alcohol since increased amounts of solvent merely require the use of increased amounts of alcohol to result in the precipitation of the copolymers. Usually a weight ratio of alcohol to solvent exceeds about 1:1 and is preferably in excess of 2:1. Usually a weight ratio of alcohol to solvent of about 4:1 is used, although ratios of 10:1 to 100:1 or more can be employed if desired. Of course the initial ratio of alcohol to solvent may be very high if a batch precipitation is used wherein the solvent mixture is added to a large volume of alcohol. A continuous precipitation system can also be employed where a stream of alcohol and a stream of solvent reaction product are simultaneously admitted to a precipitation hold tank in the proper ratios and product is continuously removed.

The usual procedure is to admix the total reaction mixture from the polymerization reactor including the solvent, copolymer, any unreacted monomers and initiator with the non-solvent by pouring and adding the total reaction mixture to the non-solvent at such a rate that the copolymer forms a fine particulate solid suitable for separation by filtration or centrifugation. If the opposite procedure is employed, namely, if the non-solvent is added to the total reaction mixture, the copolymer will tend to precipitate in larger size pieces which are not desirable. The non-solvent is preferably stirred well during the addition of the total reaction mixture. It is also preferred to add the hot reaction mixture at a temperature of between 50° C. and 95° C. to a cool non-solvent at a temperature between 20° C. and 50° C. Thus, the reaction mixture need not be cooled before addition to the non-solvent, and the addition of the hot reaction mixture to the cool non-solvent appears to aid in the formation of the finely divided particulate solid copolymer which is easily separable by filtration or centrifugation.

After the addition of the total reaction mixture to the non-solvent and the precipitation of the particulate solid copolymer, the copolymer is separated from the other components by any suitable means, such as by filtration or centrifugation. By following the process of this invention and using the defined solvent-non-solvent combinations, the copolymers are obtained in an easily filterable particulate solid form which has many advantages from the standpoint of ease of drying and handling. After separation of the copolymer solids, the remaining components can be separated by fractionation to recover the solvent, non-solvent and unreacted monomers for recyle. It is, therefore, also preferred to employ a particular solvent-non-solvent combination which is easy to separate by distillation.

The copolymer can be washed with any suitable liquid which can dissolve and thus remove any unreacted monomers. The solvent used in the reaction is suitable as are other materials, such as benzene. The wash liquid is preferably heated to aid in the washing procedure. While the copolymer may be soluble in the wash liquid, the rate of solution of the copolymer is so much slower than the rate of solution of the monomers that very little of the copolymer is dissolved in the wash liquid. The copolymer can then be dried by any conventional drying procedure to remove any residual solvent and/or washing liquids.

The copolymer after separation from the bulk of the alcohol can easily be converted to a substantially pure polyanhydride by heating the polyanhydride containing small amounts of half-ester at a temperature greater than about 80° C. while continuously removing the alcohol as formed until an amount of alcohol has been recovered corresponding to the amount of half-ester groups in the copolymer. The copolymer can be analyzed beforehand by any suitable means, such as infrared or nuclear magnetic resonance, to determine the mole percent of the total carbonyl content

of the copolymer which is present in the form of acid ester 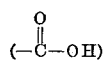

and anhydride 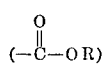

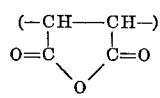

groups. The method of this invention is therefore particularly applicable as a method of purifying an alpha olefin-maleic anhydride copolymer containing a small percentage, usually on the order of 0.5 to 20 percent, of the anhydride groups as randomly distributed half-ester groups, that is, about 0.5 to 20 mole percent of the total carbonyl content of the copolymer is present as ester groupings.

It has now been found that the half-ester containing organic compounds defined above can be converted to a cyclic acid anhydride and an alcohol corresponding to the alcohol portion of the ester by simply heating the defined half-ester containing compounds while in the liquid or solid phase at a relatively mild temperature of greater than about 80° C., and usually form 80° C. to 200° C. The reaction is believed to proceed according to the general equation:

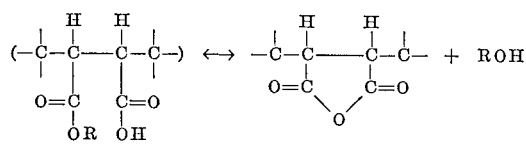

where R is as defined above. It is to be noted that the alkyl portion (R) of the alcohol which is produced is the same as the alkyl portion of the carboalkoxy (—COOR) function of the half-ester organic compound. The above reaction is reversible under the conditions of this invention, and it is necessary to remove the alcohol from the reaction zone, preferably substantially as quickly as it is formed, in order to obtain cyclic anhydrides wherein less than five mole percent of the carbonyl content is present in monoester groupings. While the alcohols can be removed in any suitable manner, such as by complexing with inorganic drying agents, it is preferred that the alcohols be removed by distillation. Hence, the process of this invention is particularly applicable to the conversion of half-ester organic compounds as defined above where the alkyl portion of the carboalkoxy function (the alcohol portion of the half-ester) forms an alcohol which can be continuously removed by distillation from the reaction zone as it is formed. Hence, the alcohol which is formed should preferably have a boiling point of between 50° C. and 190° C. at a reaction pressure of one atmosphere or less. It is preferred to heat the half-ester organic compound under a pressure less than atmospheric, preferably between 1 and 20 mm Hg so that the alcohol which is formed can easily be removed under vacuum. This method is ideally suited to the purification of the maleic anhydride-alpha olefin copolymers, which copolymers have at least 12 carbon atoms and which copolymers contain minor amounts of the half-ester (between 0.5 and 20 mole percent of the total carbonyl content present in the ester portion of the half-ester), and wherein the alkyl portion of the carboalkoxy function has between one and ten carbon atoms, since the copolymer is easily maintained in the liquid or solid phase under reduced pressure while the alcohol is easily vaporized and continuously removed. In the event a vacuum operation is not suitable, a purge gas consisting of $N_2$ or other inert gas can be continuously passed through the reaction zone at the appropriate temperature to remove the alcohol which is formed.

The reaction temperature can therefore, as noted, suitably be from about 80° C. to 200° C., with preferred reaction temperatures being from 80° C. to 150° C., and the most preferred temperatures being from 90° C. to 120° C. Temperatures below 80° C. are not as suitable, as the reaction rate to the production of the desired cyclic acid anhydride is too slow. Temperatures above 200° C. are unsuitable because color is produced in the copolymer.

The reaction time will depend on the temperature employed and is generally between one and 24 hours.

The invention will be further described with reference to the following experimental work.

EXAMPLE 1

In the run for this example, 196 grams (2 moles) of maleic anhydride; 168 grams (2 moles) of hexene-1; 400 milliliters of propylene dichloride and 4.8 grams (0.02 mole) of benzoyl peroxide were refluxed at 77° C. to 80° C. for eight hours. The resulting viscous solution was poured into methanol (2 liters), and a solid copolymer was precipitated. The precipitate was separated by filtration and dried at room temperature for 24 hours. By "dry" is meant that there is less than two weight percent physically bound alcohol present. The dilute solution viscosity of the copolymer was 0.12. Analysis of the dry solid by infrared analysis showed that about five mole percent of the total carbonyl content of the copolymer was present in the form of ester groupings.

The copolymer was then heated in a vacuum oven (1 mm. of Hg) at 100° C. for 24 hours. The weight of the final copolymer after heating at 100° C. was 296.8 grams, representing an 8.15 percent conversion of the maleic anhydride to the desired copolymer. No carbonyl in the form of ester groupings was detected in the final product by quantitative infrared analysis.

EXAMPLE 2

In the run for this example, 36.3 grams of methyl hydrogen succinate were heated at a temperature of 65° C. in a vacuum oven (less than 1 mm. of Hg) for 24 hours and no anhydride was formed.

EXAMPLE 3

The product from Example 2 was further heated at 84° C. for 24 hours and then at 100° C. for 24 hours and no anhydride was recovered.

EXAMPLE 4

The product from Example 3 was further heated at 150° C. for 24 hours and the only product was a trace of charred material.

EXAMPLE 5

In the run for this example, 40 grams of the finally dried maleic anhydride-hexene-1 copolymer prepared as in Example 1 were admixed with 90 ml. of hexyl alcohol (an excess over that necessary to prepare the half-ester) and heated at 140°–150° C. for 24 hours. The product showed that anhydride groups were present.

The run was continued at a temperature of 80° C. for 20 hours and analysis of the product showed no anhydride groups were present. The run was continued for four more hours and the temperature was increased to 140°–150° C. Analysis of the product showed the presence of anhydride groups in the same amount as in the first portion of the run made at 140°–150° C.

Example 5 shows that even in the presence of excess alcohol, the half-ester compounds will form at least some anhydride groups if the temperature exceeds about 80° C., but that unless the alcohol is removed, a substantially pure anhydride cannot be formed even at temperatures as high as 140°–150° C.

EXAMPLE 6

In the run for this example, 30 grams of succinic anhydride were reacted with an excess of isooctyl alcohol at 80° C. for four hours to produce isooctyl hydrogen succinate. Analysis showed all the anhydride groups were reacted to form the desired compound.

The product was heated for five additional hours at 100° C. while still in excess alcohol. No anhydride groups were found in the product.

The product was heated for an additional 24 hours at the reflux temperature of 140° C. in an attempt to convert some of the isooctyl hydrogen succinate to succinic anhydride, but no anhydride was found in the product.

A comparison of Examples 5 and 6 shows that only those half-ester compounds where the carbonyl groups of the acid and ester functions are on adjacent internal aliphatic carbon atoms will convert to cyclic anhydride compounds by the method of this invention. The isooctyl hydrogen succinate of Example 6 has the carbonyl groups of the acid and ester functions on the terminal carbon atoms and thus will not convert to the anhydride by the method of this invention.

EXAMPLE 7

In the run for this example, 7500 cc. of hexene-1 and 2940 grams of maleic anhydride were reacted in 13,500 cc. of propylene dichloride and 1500 cc. of carbon tetrachloride using 145.2 grams of benzoyl peroxide as the catalyst in a 10-gallon autoclave for 12 hours at 129° C. The resulting copolymer had a dilute solution viscosity of 0.64. The grams of unrecovered copolymer was 4668.

The product copolymer was mixed with seven gallons of methanol and refluxed for 24 hours at 65° C. in the absence of a catalyst and without removing water to obtain the methyl half-ester. Infrared analysis showed the absence of any carbonyl groups present as anhydride groups in the product.

The product was heated for five hours at 50° C. under a vacuum of 1 mm. of Hg. Infrared analysis showed no anhydride groups in the product.

The product was further heated at 80° C. for 16 hours while removing any alcohol as formed, i.e. under a vacuum of 1 mm. of Hg and infrared analysis showed that about half of the carbonyl groups were now present as anhydride groups. Continued heating under vacuum at 100° C. for an additional 121 hours showed the product to be substantially pure anhydride.

Example 7 shows that a substantially pure half-ester of a maleic anhydride-hexene-1 copolymer can be converted to a maleic anhydride-hexene-1 copolymer substantially free of ester groups.

A 1-octene-maleic anhydride copolymer was prepared as follows:

392 grams (4.0 moles) of maleic anhydride;
875 grams (7.8 moles) of 1-octene;
2000 milliliters of propylene dichloride; and
9.68 grams (0.04 mole) of benzoyl peroxide were refluxed at 77° C.—80° C. for eight hours.

A series of runs was made by pouring six grams of the viscous polymer solution into a series of alcohols having from one to four carbon atoms, i.e. methanol, ethanol, n-propanol and n-butanol. The alcohol to reaction product solution weight ratios were varied from 1:2 to 4:1. The results of this series of runs are shown on Table I below.

TABLE I

[Weight ratio of alcohol to solution of 1-octene-maleic anhydride copolymer in propylene dichloride]

| Example No. | Carbon No. of alcohol | 1:2 | 1:1 | 2:1 | 4:1 |
|---|---|---|---|---|---|
| 8 | $C_1$ | Gel | Sticky | [1]100% | 100% |
| 9 | $C_2$ | Sticky | 97% | | 100% |
| 10 | $C_3$ | Gel | 100% | 103% | 100% |
| 1 | $C_4$ | Gel | 91% | 90% | 87% |

[1] Percent recovery of copolymer as a finely divided filterable solid.

Referring to Table I, it can be seen that an alcohol to reaction product solution weight ratio of 1:2 is not sufficient to result in the precipitation of the copolymer in a finely divided filterable form. The weight ratio of alcohol to reaction product solution must be at least 1:1 for alcohols having from two to four carbon atoms and must be at least about 2:1 for methanol.

An ethylene-maleic anhydride copolymer (126 grams) purchased from Monsanto Chemical Company was reacted with 271 grams of n-butanol at 117° C. for four hours to produce some butyl half-ester of the ethylene-maleic anhydride copolymer. Analysis of the esterified copolymer by infrared indicated all of the anhydride groups had reacted. Ester peaks were, of course, formed and could also be observed by the infrared analysis.

EXAMPLE 8

100 ml. of the esterified reaction product solution described above were poured into 300 ml. of n-hexane and an oily product separated. This oily product was really the partially esterified copolymer dissolved in n-butanol. The oily product was washed with three separate 300 ml. portions of n-hexane to remove more of the n-butanol, and the resulting product was a soft white rubbery-like material. When this final product was heated in a vacuum oven for 18 hours at 120° C., a brittle transparent amber-like solid was obtained.

The brittle solid was insoluble in acetone, indicating the solid was crosslinked.

EXAMPLE 9

100 ml. of the esterified reaction product solution described above were poured into 300 ml. of water at room temperature and a gummy solid similar to the final washed product of Example 8 was obtained.

This rubbery-like solid was heated in a vacuum oven at 50° C. for 18 hours and the resulting product was a brittle transparent amber-like solid. The solid was washed and heated for an added 20 hours in a vacuum oven at 50° C. as it had a slight odor of n-butanol.

The final heated solid was found to be soluble in acetone, indicating the half-ester did not decompose and no crosslinking occurred.

A comparison of Examples 1 and 8 shows that a half-ester of ethylene-maleic anhydride copolymers (Example 8) will not function in accordance with the teachings of this invention to reform the alcohol and the cyclic acid anhydride at temperatures greater than 80° C. while removing the alcohol as formed, whereas half-esters of the higher carbon number alpha olefin-maleic anhydride copolymers will (Example 1).

A partially esterified ethylene-maleic anhydride copolymer was prepared by first dissolving the copolymer in acetone and then precipitating the copolymer in methanol. The precipitate was quickly separated from the methanol since too long a contact time results in solution of the formed esterified product in the alcohol. The precipitate was approaching the gummy stage when separated.

EXAMPLE 10

A portion of the partially methyl esterified ethylene-maleic anhydride copolymer prepared as above was heated in a vacuum oven at 50° C. for 18 hours. The product was soluble in acetone, showing the ester did not decompose at 50° C.

EXAMPLE 11

A second portion of the partially methyl esterified ethylene-maleic anhydride copolymer prepared as above was heated in a vacuum oven at 120° C. for 18 hours. The product was insoluble in acetone, showing internal crosslinking.

EXAMPLE 12

When a methyl half-ester of a hexene-1-maleic anhydride copolymer was heated at 120° C. in a vacuum oven for 18 hours, the product was soluble in acetone, showing that no internal crosslinking was occurring.

A comparison of Examples 8, 11 and 12 shows that the partially esterified products of ethylene and maleic anhydride react differently at temperatures in excess of 80° C. than do the partially esterified products of the higher carbon number olefins and maleic anhydride.

EXAMPLE 13

In the run for this example, 30 grams of a vinyl chloride-maleic anhydride copolymer were partially esterified using 700 ml. isooctyl alcohol at a temperature of 185° C. for six hours. Toluene sulfonic acid (0.3 gram) was used as the catalyst. Analysis of the esterified vinyl chloride-maleic anhydride copolymer indicated the absence of anhydride groups. This esterified vinyl chloride-maleic anhydride copolymer contained some half-ester as indicated by an acid number of 146 and was treated in the same manner as the esterified maleic anhydride copolymer of Example 7 and substantially the same results were obtained, i.e. a gel formed.

A comparison of Examples 8, 11 and 13 with Examples 1–7 shows that not all partially esterified olefin-maleic anhydride copolymers will thermally convert to substantially pure cyclic anhydride by the method of this invention. While it is not certain, it is believed the size of the group attached to the olefinic carbon atoms effects the spacial position of the half-ester groups on the adjacent carbon atoms, the larger group forcing the half-ester groups together to form the desired cyclic anhydrides. When the group attached to the olefinic carbon atoms is too small (such as hydrogen on ethylene and chlorine on vinyl chloride), the half-ester groups are freer to interact and internally crosslink the partially esterified copolymers. Thus, partially esterified ethylene-maleic anhydride copolymers and partially esterified vinyl chloride-maleic anhydride copolymers internally crosslink when subjected to temperatures in excess of 80° C.

EXAMPLE 14

A maleic anhydride-1-octadecene copolymer was prepared by adding 303 grams (1.2 moles) of 1-octadecene to a reaction mixture consisting of 200 grams (1.8 moles) of propylene dichloride, 58.8 grams (0.6 mole) of maleic anhydride, and 1.5 grams (0.006 mole) of benzoyl peroxide. The reaction conditions included a temperature of 115° C. to 117° C. (reflux), a pressure of atmospheric and a reaction time of four hours.

The reaction product was a solution of the maleic anhydride-1-octadecene copolymer and some unreacted monomers in propylene dichloride (1,2-dichloropropane). Upon cooling, the entire reaction product remained fluid.

The maleic anhydride-1-octadecene reaction product solution was poured slowly at a temperature of about 25° C. into four times its weight of n-propanol at room temperature and a finely divided filterable white solid was formed and was separated by simple filtration. The separated copolymer was found by infrared analysis to contain a small amount of ester groups. The copolymer was dried under vacuum at 120° C. for 12 hours. Infrared analysis of the dried reaction product showed the absence of ester groups.

In some instances, it may be desirable to obtain a polyanhydride compound by the copolymerization of maleic anhydride and an olefinic compound as defined above which is substantially free of carboxyl (—COOH) groups but which has a number of ester groups per molecule. These poly(anhydride-ester) compounds free of carboxy groups would be suitable for use in the preparation of crosslinked thermosetting resins by reaction with a mono- or polyepoxide compound. It is desirable to have a carboxylic acid free of polyanhydride since the reaction of the carboxylic acid group (—COOH) with the epoxide group

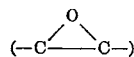

results in the production of hydroxyl groups which are undesirable in the finished resin. The presence of ester groups in the poly(anhydride-ester) compound results in a softer resin than would otherwise be possible. These desirable poly(anhydride-ester) compounds free of acid groupings can now suitably be prepared by the method of this invention.

The copolymers prepared by the reaction of maleic anhydride with an olefinic compound as described above can be contacted with a non-aromatic alcohol having between one and ten, preferably between one and four, carbon atoms per molecule to convert the anhydride groups to mono- and diester groups. By a non-aromatic alcohol is meant a monohydric alcohol where the alcoholic hydroxyl groups are not directly attached to an aromatic ring. The aliphatic and alicyclic monohydroxy alcohols are preferred. The alcohol can be saturated or unsaturated, substituted or unsubstituted with substituents such as halogens, especially chlorine, $NO_2$, etc.

Examples of suitable alcohols include, but are not limited to: methyl alcohol; ethyl alcohol; n-propyl alcohol; t-butyl alcohol; allyl alcohol; n-amyl alcohol; cyclohexanol; n-octyl alcohol; benzyl alcohol; 2-nitro-1-butanol; 3-chloro-1-propanol; and 1-decanol.

The copolymers useful in this aspect of the invention are those defined above. These copolymers are contacted with the alcohol under esterification conditions, such that any water formed during the reaction can be continuously removed. Water can be removed by physical means, such as with an adsorbent; however, it is preferred to remove water by distillation from the reaction mixture. Usually the water is removed as an azeotrope with the alcohol employed if it is a lower carbon number alcohol or the water can be removed as an azeotrope with an added solvent, such as benzene. The formation and removal of water is indicative of the formation of diester groups in the copolymer, and, indeed, the water is a measure of the amount of diester formation. It was expected that the monoester would exclusively form, initially followed by the formation of the diester, but for some unknown reason, water is formed and can be removed very shortly after the reaction begins, indicating that if water is removed some diester can be produced before all of the anhydride groups are converted to half-ester groups. It is usually desirable to obtain an acid free anhydride-diester compound where the mole percent of the total carbonyl content present in ester groups is between 20 and 80, and preferably between 30 and 60, percent. An amount of water is therefore removed from the reaction zone equivalent to the amount of diester desired in the final product. The esterified product may contain some unreacted anhydride groups or may contain only half-ester and diester groupings, depending on reaction conditions including time, temperature and whether a catalyst is employed.

The reaction temperature for the esterification is suitably between 80° C. and 200° C., but is usually between 80° C. and 150° C. The exact reaction temperature will depend on the charge stocks employed, whether an azeotroping solvent, such as benzene, is employed, and whether a catalyst is utilized. The use of azeotroping solvents allows the use of lower reaction temperatures to remove water, but this generally increases reaction time. Temperatures above 200° C. are to be avoided as these temperatures promote the formation of undesirable color bodies. A catalyst can be employed in the formation of a diester to reduce the reaction time, and suitable catalysts include the mineral acids, such as sulfuric, hydrochloric, nitric, and phosphoric, and organic acids such as benzene, sulfonic and paratoluene sulfonic acids.

The reaction product which comprises an organic compound comprising at least one half-ester group and one diester group can then be heated in accordance with the invention at a temperature in excess of about 80° C. to convert the half-ester groups to a cyclic anhydride group and a by-product alcohol corresponding to the alcohol portion of said half-ester group. The alcohol is removed substantially as quickly as it is formed and an organic compound substantially free of carboxy groups and comprising at least one cyclic anhydride group and at least one diester group is recovered. This aspect of the invention will be further described with reference to the following specific example.

EXAMPLE 15

Into a resin kettle was charged 100 grams of a propylene-maleic anhydride copolymer, 168 grams of n-propyl alcohol, 100 milliliters of benzene, and 1.0 gram of benzene sulfonic acid. The propylene-maleic anhydride copolymer had substantially a 1:1 ratio of propylene to maleic anhydride. The reaction was heated to reflux (about 80° C. at atmospheric pressure) and after about 30 minutes water was recoverable from the reflux stream. The reaction was maintained at this temperature for 72 hours, during which time a total of 3.3 cc. of water were removed. Based on the water recovered, about 33 mole percent of the carbonyl groups were converted to diester groups. Infrared analysis of the product at this point indicated only a small amount of anhydride groups were remaining. The solvents, i.e. the excess n-propyl alcohol and benzene were thereafter distilled off under vacuum. The product was heated for 30 hours at 110° C. under a vacuum of 1 mm. of Hg. A yield of 61.7 grams of dry product was obtained and infrared analysis indicated the product contained no carbonyl groups present as free acid; 46 mole percent of the carbonyl groups present as ester groups; and 54 mole percent of the carbonyl groups present as anhydride groups.

Example 15 above shows that an organic compound containing half-ester-diester groupings can suitably be converted by the method of this invention to a diester-anhydride compound suitable for use in the preparation of thermosetting resins.

Resort may be had to such variations and modifications as fall within the spirit of the invention and the scope of the appended claim.

I claim:
1. A process for the preparation of a copolymer of maleic anhydride and octene in a finely divided filterable solid form which comprises:
   copolymerizing maleic anhydride and octene in the presence of a free-radical catalyst and a solvent for the maleic anhydride, said octene and the resulting copolymer; and
   thereafter admixing said copolymer product while in solution with a monohydroxy aliphatic alcohol having from 1 to 4 carbon atoms, the amount of said alcohol being sufficient and the rate of addition of said copolymer solution being such as to result in precipitation of the copolymer in a particulate solid form.

References Cited

UNITED STATES PATENTS

| | | | |
|---|---|---|---|
| 3,355,438 | 11/1967 | Lyons | 260—78.5 |
| 3,461,108 | 8/1969 | Heilman et al. | 260—78.5 |
| 2,977,334 | 3/1961 | Zopf et al. | 260—27 |
| 3,458,484 | 7/1969 | Zimmerman et al. | 260—78.5 |
| 3,318,851 | 5/1967 | Nicholls et al. | 260—78.5 |

JOSEPH L. SCHOFER, Primary Examiner

J. KIGHT III, Assistant Examiner